US008051474B1

(12) United States Patent
Bedin et al.

(10) Patent No.: US 8,051,474 B1
(45) Date of Patent: Nov. 1, 2011

(54) METHOD AND APPARATUS FOR IDENTIFYING TRUSTED SOURCES BASED ON ACCESS POINT

(75) Inventors: Oeystein Bedin, Westminster, CO (US); Rodney W. Black, Louisville, CO (US); Stewart M. Brown, Jr., Arvada, CO (US)

(73) Assignee: Avaya Inc., Basking Ridge, NJ (US)

( * ) Notice: Subject to any disclaimer, the term of this patent is extended or adjusted under 35 U.S.C. 154(b) by 1023 days.

(21) Appl. No.: 11/535,425

(22) Filed: Sep. 26, 2006

(51) Int. Cl.
*G06F 7/04* (2006.01)
*H04L 29/06* (2006.01)
(52) U.S. Cl. ............................ 726/12; 713/151; 726/11
(58) Field of Classification Search ............ 726/12, 726/11; 713/151
See application file for complete search history.

(56) References Cited

U.S. PATENT DOCUMENTS

| | | | |
|---|---|---|---|
| 6,006,258 A | 12/1999 | Kalajan | |
| 6,067,569 A * | 5/2000 | Khaki et al. | 709/224 |
| 6,182,226 B1 | 1/2001 | Reid et al. | |
| 6,243,815 B1 * | 6/2001 | Antur et al. | 726/11 |
| 6,324,648 B1 * | 11/2001 | Grantges, Jr. | 726/12 |
| 6,563,824 B1 | 5/2003 | Bhatia et al. | |
| 6,651,174 B1 * | 11/2003 | Nagaoka et al. | 726/11 |
| 6,965,939 B2 | 11/2005 | Cuomo et al. | |
| 7,024,686 B2 | 4/2006 | Brawn et al. | |
| 7,031,327 B2 | 4/2006 | Lu | |
| 7,143,442 B2 * | 11/2006 | Scarfe et al. | 726/23 |
| 7,331,061 B1 * | 2/2008 | Ramsey et al. | 726/23 |
| 2002/0010800 A1 * | 1/2002 | Riley et al. | 709/249 |
| 2003/0131116 A1 * | 7/2003 | Jain et al. | 709/230 |
| 2003/0204632 A1 * | 10/2003 | Willebeek-LeMair et al. | 709/249 |
| 2004/0049701 A1 * | 3/2004 | Le Pennec et al. | 713/201 |
| 2004/0158744 A1 * | 8/2004 | Deng et al. | 713/201 |
| 2004/0230841 A1 * | 11/2004 | Savini | 713/202 |
| 2004/0255043 A1 * | 12/2004 | Salo et al. | 709/236 |
| 2005/0039047 A1 * | 2/2005 | Raikar et al. | 713/201 |
| 2005/0060295 A1 * | 3/2005 | Gould et al. | 707/3 |
| 2006/0101262 A1 * | 5/2006 | Haney | 713/153 |
| 2007/0011734 A1 * | 1/2007 | Balakrishnan et al. | 726/13 |
| 2007/0022474 A1 * | 1/2007 | Rowett et al. | 726/11 |
| 2007/0022479 A1 * | 1/2007 | Sikdar et al. | 726/22 |
| 2007/0025246 A1 * | 2/2007 | Pirzada et al. | 370/230 |

* cited by examiner

*Primary Examiner* — Techane Gergiso
(74) *Attorney, Agent, or Firm* — Sheridan Ross P.C.

(57) ABSTRACT

Methods and systems for distinguishing between sources of messages at a computer system resource are provided. In particular, messages are classified according to the physical interface at which the messages are received. A message received at an interface connected to a trusted source has the port address associated with that message mapped to a predefined port address by a firewall computer, before being passed to a server computer or other system resource. A message received at an interface that is connected to an untrusted source is passed to the server computer using the original port address. The server computer may then treat messages associated with one of the reserved port addresses differently from messages associated with a non-reserved port address.

13 Claims, 4 Drawing Sheets

METHOD AND APPARATUS FOR IDENTIFYING TRUSTED SOURCES BASED ON ACCESS POINT

FIELD

The present invention is related to identifying trusted sources based on access point.

BACKGROUND

One advantage of computer networks is that they allow access to resources from distributed computer devices. However, this can pose difficulties with respect to network security. In particular, it may be desirable to restrict access or require complex or more stringent security procedures with respect to computer devices that are in locations where physical access to the devices is not adequately controlled. However, it may be undesirable to restrict access or require complex security procedures with respect to computer devices that are in a secure location, such as in a facility to which physical access by persons is controlled in a secure way. Therefore, it is desirable to distinguish between devices that are in secure locations and those that are not.

In order to identify different computer devices, networks may use various addressing schemes. For example, in a Transmission Control Protocol/Internet Protocol (TCP/IP) network, devices can be distinguished from one another based on one or more elements of their assigned IP address. An additional means for identifying computer devices is through the device media access control (MAC) address. Therefore, computer networks can apply different security requirements based on whether such an address is associated with a computer known to be at a secure location or not. However, these identifiers and addresses can be forged or spoofed by those wishing to gain unauthorized access to the computer resource. Therefore, computer resources that comprise access points through computer devices located in public or other unsecure locations have either been vulnerable to unauthorized access, and/or have needed to apply stringent security measures to all access points, including those in secure locations.

The more secure or stringent measures for controlling access to networked computer resources can be cumbersome and difficult to use and administer. For example, one means for verifying that a source or computer device is a trusted source is through the use of digital certificates and encryption. However, these can require exchanges of encryption key information or the involvement of third party verification providers. Moreover, such procedures need to be applied to all attempts at accessing the protected computer resource, even if the access attempt is in fact from a computer device or source in a secure location. Therefore, it would be desirable to distinguish between trusted and untrusted computer devices or sources, so that a level of security that is appropriate to the potential threat can be applied.

SUMMARY

Embodiments of the present invention are directed to solving these and other problems and disadvantages of the prior art. In accordance with embodiments of the present invention, interfaces on a firewall computer or device that are connected to computers or sources in secure locations are identified. In addition, a set of reserved port addresses are defined. When a message directed to a computer resource protected by the firewall computer is received at one of the interfaces on the firewall computer that has been identified as being associated with a source that is in a secure location, that message is mapped to one of the reserved port addresses. When a message directed to a computer resource protected by the firewall computer is received at an interface that has not been identified as being associated with a source in a secure location, that message is not mapped to one of the reserved port addresses. Furthermore, if a message is received at any of the interfaces of the firewall computer that, as received, is addressed to one of the reserved port addresses, that message is blocked by the firewall computer.

The use of reserved port addresses provides a means for distinguishing in the computer resource between messages that originate from a secure source and messages that do not. Accordingly, messages that have been mapped to one of the reserved port addresses may be passed to a first application or subjected to a first set of security measures that is applied to communication sessions with trusted sources. Messages that have not been mapped to one of the secure port addresses can be passed to a second application or subjected to a second set of security measures that is applied to communication sessions with untrusted sources. In this way, more complex or cumbersome security measures can be applied selectively to messages associated with untrusted sources.

Additional features and advantages of embodiments of the present invention will become more readily apparent from the following description, particularly when take together with the accompanying drawings.

DETAILED DESCRIPTION

Figure 1:
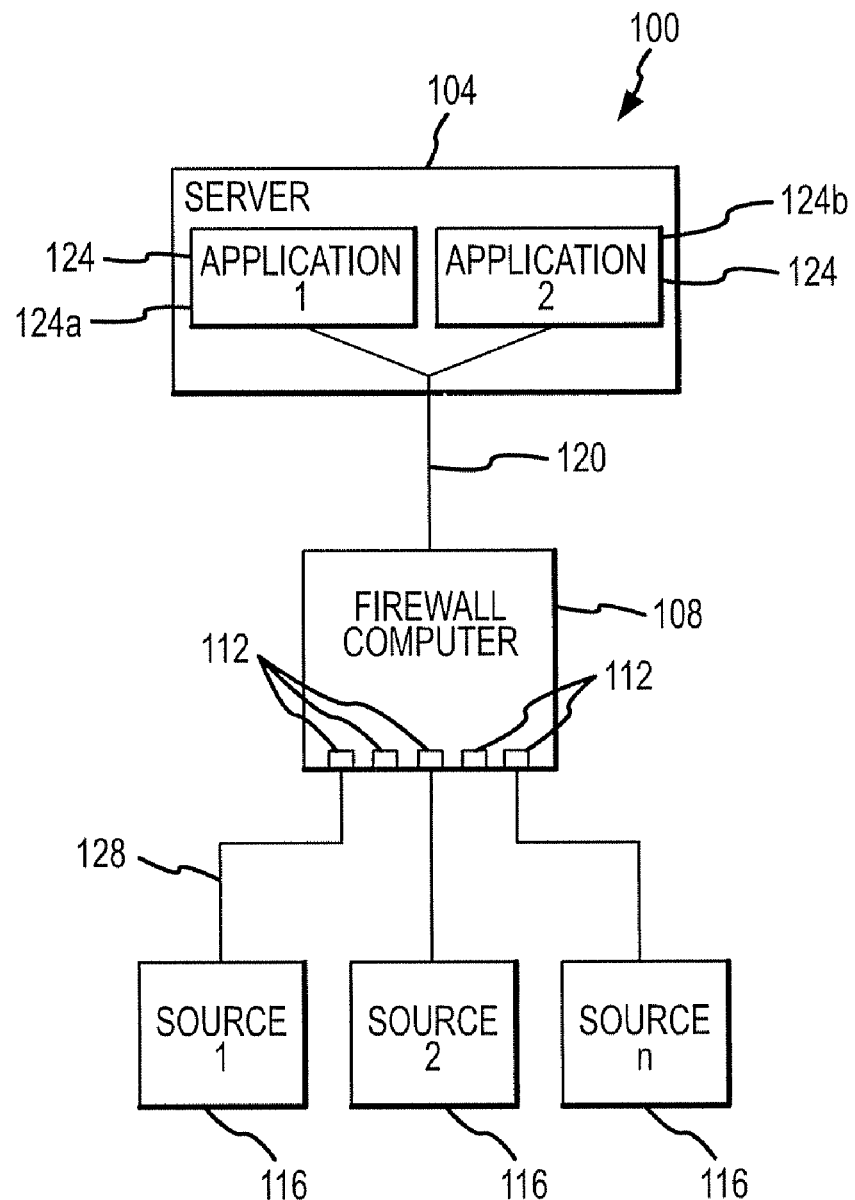
FIG. 1 is a block diagram of components of a computer network capable of distinguishing between trusted and untrusted sources of data in accordance with embodiments of the present invention.

FIG. 1 depicts components that may be included in a computer system 100 capable of distinguishing between trusted and untrusted sources of messages in a computer network in accordance with embodiments of the present invention. The system 100 generally includes a computer resource, such as a server computer 104. The server computer 104 is connected to a firewall computer 108. The firewall computer 108 includes a number of interfaces 112 comprising physical ports that provide for interconnections with a plurality of source computers or devices 116.

The server computer 104 may comprise any source of data, processing facilities or other services that can be available over a computer network. In accordance with embodiments of the present invention, the server computer 104 is interconnected to the firewall computer 108 by a communication channel 120. Moreover, as described herein, the server computer is able to distinguish or discriminate between messages or communications that originated from a trusted source computer 116 and messages or communications that originated from an untrusted source computer 116. The server computer 104 may include or be associated with a plurality of applications or security procedures 124. More particularly, a first application 124a may apply a first set of security measures or access permissions with respect to messages received from trusted source computers 116, while a second application 124b may apply a second set of security measures or access permissions with respect to messages received from untrusted source computers 116.

The firewall computer 108 may comprise a switch, hub, router, gateway or other device that provides or is associated with a number of physical ports or interfaces 112 capable of completing physical connections between the firewall computer 108 and the source computers 116. In accordance with embodiments of the present invention, a trusted source 116 must be interconnected to the firewall computer through a wireline connection 128, or some other physical interface through which the physical location of the trusted source 116 is known to be in a secure location. An untrusted source device 116 is typically not in a location in which physical access is controlled, at least as required by the provider or administrator of the server computer 104. In accordance with embodiments of the present invention, multiple firewall computers 108 may be chained together through a secure interface 112 or series of secure interfaces 112.

Figures 2, 3:
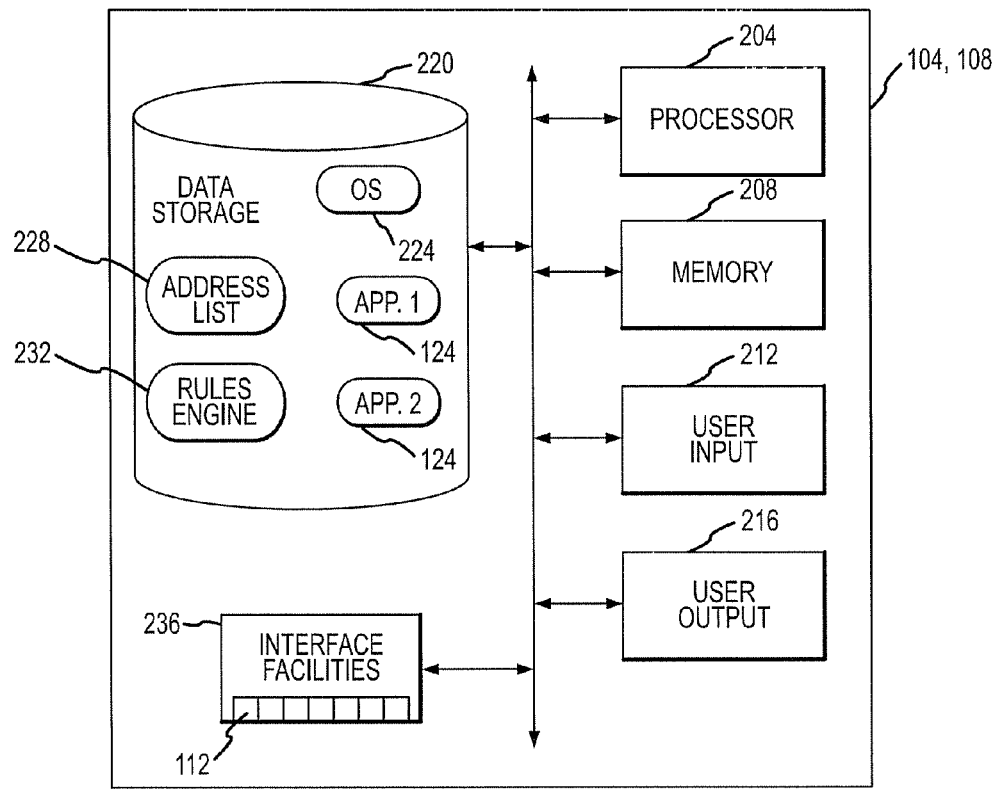
FIG. 2 is a block diagram of components of a firewall computer and/or server computer in accordance with embodiments of the present invention.
FIG. 3 depicts the reservation of addresses in accordance with embodiments of the present invention.

FIG. 2 depicts components or features that may be included as part of server computer 104, and/or a firewall computer 108. Because such components may be included as part of (or not included as part of) such devices 104, 108 in various combinations, it should be understood that various of the components are not necessarily limited to any particular device. However, where a typical embodiment includes particular components as part of a particular device of the system 100, mention of such typical arrangement will be made.

The components may include a processor 204 capable of executing program instructions. Accordingly, the processor 204 may include any general purpose programmable processor or controller for executing application programming. Alternatively, the processor may comprise a specially configured application specific integrated circuit (ASIC). The processor 204 generally functions to run programming code implementing various functions performed by the related device. For example, such functions may include the provision of requested data or services provided by a server computer or computer resource 104, or the mapping (or not) of a message to a reserved port address based on the interface 112 at which the message was received by a firewall computer 108, as described herein.

The computer 104, 108 may additionally include memory 208 for use in connection with the execution of programming by the processor 204, and for the temporary or long-term storage of data or program instructions. For example, the memory may be used in connection with the operation of applications. The memory 208 may comprise solid-state memory resident, removable or remote in nature, such as DRAM and SDRAM. Where the processor 204 comprises a controller, the memory 208 may be integral to the processor 204.

In addition, various user input devices 212 and user output devices 216 may be provided. Examples of user input devices 212 include a microphone, keyboard, numeric keypad and pointing device combined with a screen or other position encoder. Examples of user output devices 216 include a speaker, alphanumeric display, ringer, or display. In general, user input 212 and user output devices 216 may be used by system 100 administrators to interface with or through other devices or participants in the system 100. Although the user inputs 212 and outputs 216 are shown as being directly connected to the related device, it should be appreciated that features or applications can be accessed remotely.

Data storage 220 may be provided for the storage of application programming and/or data. For example, operating system software 224 may be stored in the data storage 220. An example of data that may be stored in the data storage 220 is a list or table of blocked and/or reserved port addresses 228. An example of a particular application that may be stored in data storage 220 is a rules engine 232. In connection with a firewall computer 108, the rules engine 232 may operate to block messages received at any interface 112 that, as received, is addressed to a reserved port address, and to map messages received at an interface 112 defined as being connected to a trusted source computer 116 to a reserved port address before passing such messages on to the server computer 104. In connection with a server computer 104, the rules engine 232 may operate to route or pass messages addressed to a reserved port address to a first application or security procedure 124, and to route or pass messages not addressed to a reserved port address to a second application or security procedure 124. The data storage 220 may also store the first and second (or more) applications or security procedures 124.

A computer 104, 108 may also include one or more communication network or direct connect interface facilities 236. For a firewall computer 108, the interface facility 236 includes a number of individual ports or interfaces 112 for interconnection to other devices, such as source computers, as well as an interface for supporting the communication channel 120 between the firewall computer 108 and the server computer 104. For a server computer 104, the interface facility 236 includes at least an interface for supporting the communication channel 120 between the server computer 104 and the firewall computer 108. Examples of communication facilities 236 include a packet data network interface, such as a wired or wireless Ethernet interface, or token ring interface.

FIG. 3 depicts a table 228 used in connection with the defining of blocked and/or reserved port addresses in accordance with embodiments of the present invention. In general, port addresses are associated with communications, for example TCP/IP communications, between devices on a network. The set of all possible port numbers or port addresses 304 is depicted in the first column of the table. Within the set of all possible port numbers 304, a set of blocked 308 and/or reserved 312 port numbers or port addresses are defined. In accordance with embodiments of the present invention, each port number defined as a blocked port number 308 may also be defined as a reserved port number 312. In accordance with other embodiments of the present invention, each reserved port number 312 is also a blocked port number 308, but every blocked port number does not need to have a corresponding reserved port number 312. Although depicted in FIG. 3 as a block or range of port numbers, a set of blocked port numbers 308 and reserved port numbers 312 may comprise a plurality of ranges of port numbers and/or individually defined port numbers. As described in greater detail below, messages received at an interface 112 that has been identified as being interconnected to a trusted 116 source and that are not addressed to one of the blocked port numbers 308 are associated with or mapped to a reserved port number 312 and are then passed to the server computer 104. The server computer 104 can thus identify a message from a trusted source 116, because such a message will use a reserved port address 312.

Figure 4:
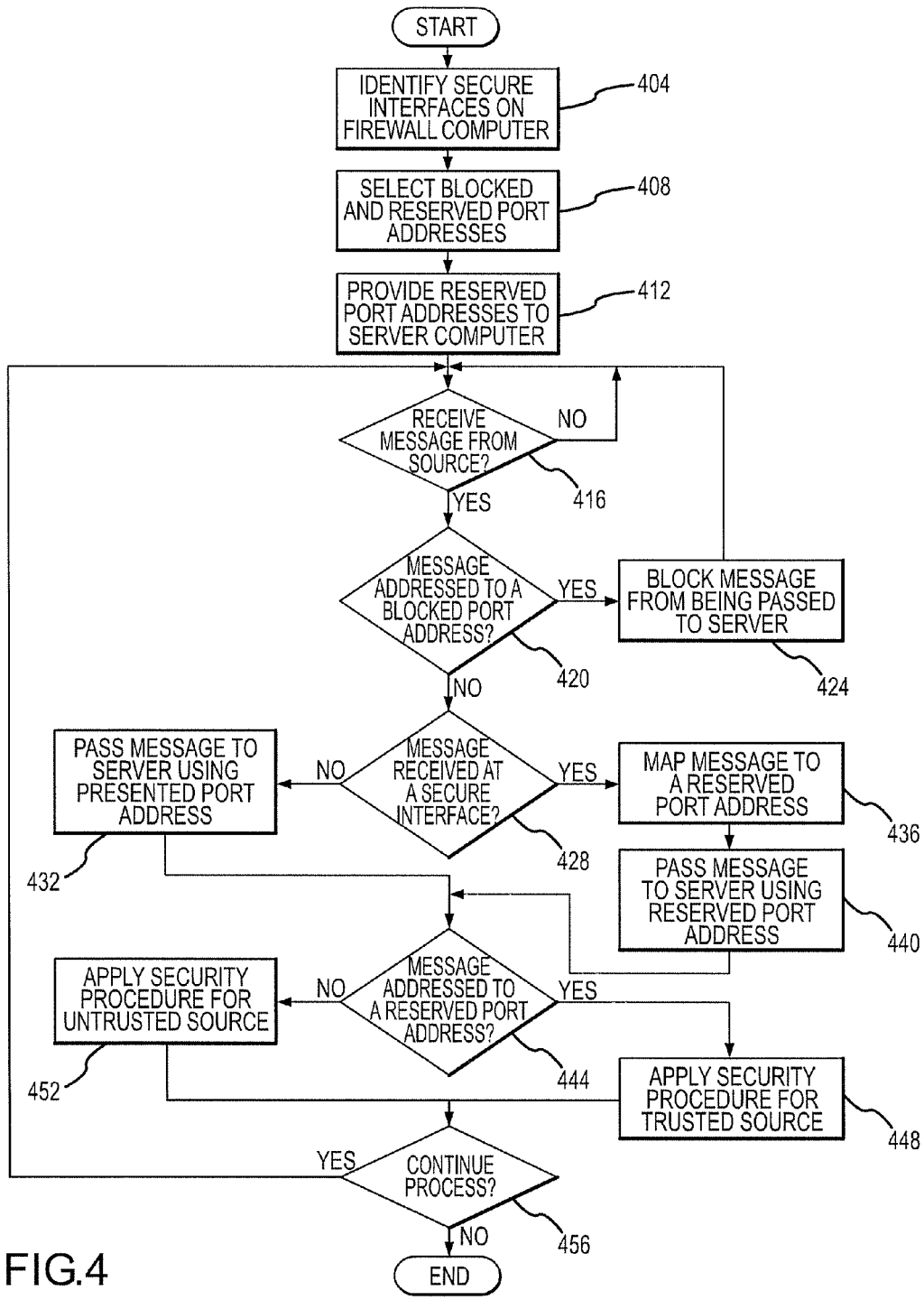
FIG. 4 is a flowchart depicting aspects of a process for distinguishing between trusted and untrusted sources of data in a computer network in accordance with embodiments of the present invention.

Aspects of a process for identifying messages from trusted sources 116 in accordance with embodiments of the present invention are illustrated in FIG. 4. Initially, secure interfaces 112 on the firewall computer 108 are identified (step 404). In general, a secure interface 112 is one that is interconnected to a source computer 116 that is in a secure location (e.g., a location to which physical access is controlled), and that is not interconnected or potentially interconnected to an unsecure source computer 116. Accordingly, an example of a secure interface 112 is an interface 112 that is directly connected to a source computer 116 within a security controlled facility by a wireline connection 128. An example of an interface 112 that is not secure is one through which publicly accessible source computers 116 interconnect to the firewall computer 108.

At step 408, blocked 308 and reserved 312 port addresses are selected. In general, each blocked port address 308 is also selected as a reserved port address 312, although such a one-to-one correspondence between all blocked port addresses and reserved port addresses 312 is not required. Instead, all that is required is that at least some blocked port addresses 308 have a corresponding reserved port address 312. Once the reserved port addresses 312 have been selected, those port addresses 312 are communicated to the server computer 308 (step 412). Accordingly, both the firewall computer 108 and the server computer 104 maintain a list of reserved port addresses 312, for example as or part of the address list 228.

A determination may then be made as to whether a message or message frame has been received from a source computer 116 at one of the interface 112 ports of the firewall computer 108 (step 416). If no message is detected, the process may idle at step 416.

In response to receiving a message at an interface 112, a determination is made as to whether the received message is addressed to a blocked port address 308 (step 420). If the received message is addressed to a blocked port address 308, the message is blocked, and is not passed to the server computer 104 (step 424). The process may then return to step 416 to await the receipt of a next message.

If the received message is not directed to a blocked port address 308, a determination is made as to whether the message was received at an interface 112 that has been identified as a secure interface 112 (step 428). If the message was not presented at a secure interface 112, it is passed to the server using the port address originally presented as part of the message at the interface 112 (step 432). If a message is presented at a secure interface 112, the port address associated with that message is mapped to one of the reserved port addresses 312 (step 436). This mapping may be performed through, for example, network address translation. The message is then passed to the server using the reserved port address (step 440).

After passing the message to the server at steps 432 or 440, the server computer 104 determines whether the message, as received by the server computer 104, is addressed to one of the reserved port addresses 312 (step 444). If the message is addressed to a reserved port address 312, the server computer 104 may apply a security procedure used for a trusted source 116 (step 448). This may comprise passing the message to a first application or subjecting the message to a first security protocol 124a. If the message is not addressed to one of the reserved port addresses 312, the server computer 104 may apply a security procedure used for an untrusted source 116 (step 452). This may comprise passing the message to a second application or subjecting the message to a second security protocol 124b. In general, the first application 124a may require a lower level of verification or authentication in connection with accessing the resource or server computer 104 than the second application 124b. That is, the security procedures used for communications with a trusted source 116 may be lower than those applied to communications with an untrusted source 116. If the process is to remain active, determined at step 456, it may return to step 416 to await a next message from a source 116. Otherwise the process may end.

Figure 5:
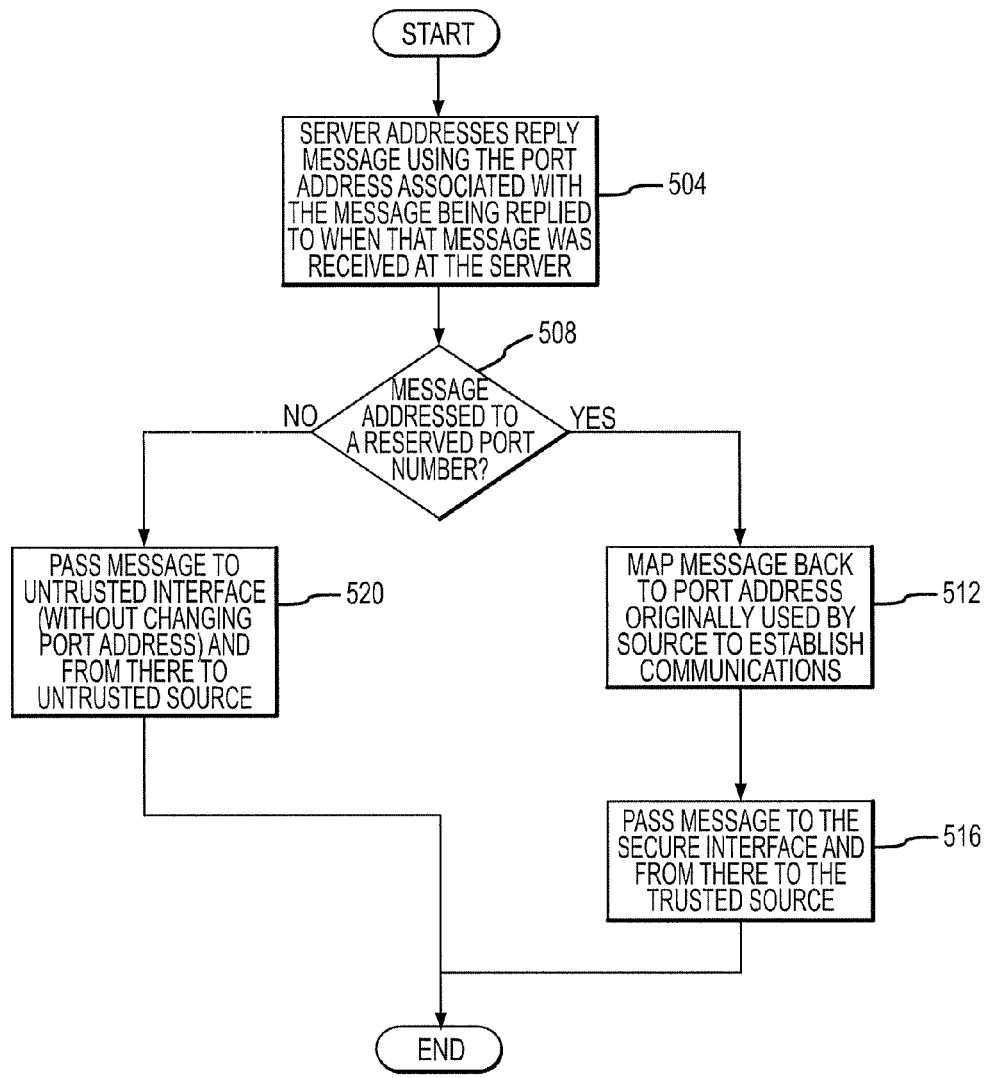
FIG. 5 is a flowchart depicting aspects of a process for providing reply messages to trusted and untrusted sources of data in a computer network in accordance with embodiments of the present invention.

Aspects of a process for providing reply messages in accordance with embodiments of the present invention are illustrated in FIG. 5. In general, the server computer 104 uses the same port address as was associated with the received message when passed to the server computer 104 by the firewall computer 108, and passes the message to the firewall computer 108 (step 504). The firewall computer 108 then determines whether the message is associated with one of the reserved port addresses 312 (step 508). If the message is associated with one of the reserved port address 312, the firewall computer 108 maps the port address of the message to the port address originally used by the trusted source 116 to present the message to the firewall computer 108 (step 512). This may be performed through network address translation. The message is then passed to the secure interface 112, and from there to the trusted source 116 (step 116). If the message is not associated with a secure interface, the message is passed to the non-secure interface 112 (without changing the port address) and from there to the untrusted source 116 (step 520). Alternatively, replies need not go through the translation process. In particular, applications commonly expect to receive messages on a different port number than the one that sends messages to. Therefore, translation with respect to replies by the server computer need not be performed.

Accordingly, it can be appreciated that embodiments of the present invention allow a server computer or other computer system resource 104 to distinguish between messages presented at trusted interfaces 112 and messages presented at untrusted interfaces 112, even though those messages are received by the resource 104 through a single or common communication channel 120. Different security procedures 124 can then be applied to messages based on determining whether those messages were received at a secure interface 112 or not. As used herein, different security procedures can comprise different log-in or other verification requirements, different levels of access to resources, or any other differential treatment determined to be appropriate for the messages received at the different interfaces 112.

It can also be appreciated by one of skill in the art after consideration of the present disclosure that implementation of embodiments of the present invention does not require the distribution of information regarding the classification or treatment of interfaces 112 or sources 116 outside of the server computer 104 or the firewall computer 108. Indeed, there is nothing that a source 116 can do to influence the classification of that source 116 as trusted or untrusted. Instead the determination is based on the interface 112 to which the source 116 is physically connected. Accordingly, the differential treatment of messages implemented by embodiments of the present invention cannot be defeated through manipulation of network addresses or other identifiers.

Although various examples have discussed the use of separate server 104 and firewall 108 computers or devices, it should be appreciated that the described functions can be performed by any number of computers or devices. In addition, a firewall computer 108 need not have integral interfaces 112. Instead, some or all of the interfaces 112 may be part of an associated router, multiplexer, switch or other device providing interfaces through which a source 116 may communicate with another device. It also should be appreciated that interfaces 112 on or associated with a firewall computer 108 are not limited to two categories. Instead, more than two categories may be defined. For example, in a system in which N categories may be defined, each interface 112 may be associated with one of the categories, and at least N−1 sets of reserved addresses may be defined.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with the various modifications required by their particular application or use of the invention. It is intended that the appended claims be construed to include alternative embodiments to the extent permitted by the prior art.

What is claimed is:

1. A method for distinguishing sources of data, comprising:
   defining a first set of reserved port addresses on a firewall computer;
   mapping, by the firewall computer, data comprising a first communication received at a first interface to one of the first set of reserved port addresses;
   mapping, by the firewall computer, data comprising a second communication received at a second interface to a port address not included in the first set of reserved port addresses;
   based on the mapping of the first communication to one of the first set of reserved port addresses, applying, by the firewall computer, a first type of security measures with respect to the first communication, wherein the first type of security measures are a first level of verification and authentication;
   determining that the first interface is interconnected to a trusted data source;
   in response to the determining that the first interface is interconnected to the trusted data source, establishing a rule that communications received at the first interface that are not addressed to one of the first set of reserved port addresses are mapped to one of the first set of reserved port addresses;
   based on the mapping of the second communication to a port address not included in the first set of reserved port addresses, applying, by the firewall computer, a second type of security measures with respect to the second communication received at the second interface, wherein the second type of security measures are a second level of verification and authentication, wherein the security measures of the first type are a lower level of verification and authentication than the security measures of the second type;
   determining that the second interface is interconnected to a data source that is not trusted;
   in response to the determining that the second interface is interconnected to the data source that is not trusted, establishing a rule that communications received at the second interface that are not addressed to one of the reserved port addresses are not mapped to one of the reserved port addresses.

2. The method of claim 1, wherein the first communication received at the first interface, as received at the firewall computer, is not addressed to one of the reserved port addresses, and wherein the second communication received at the second interface, as received at the firewall computer, is not addressed to one of the reserved port addresses.

3. The method of claim 2, further comprising:
   blocking a communication received at any interface that as received is addressed to one of the reserved port addresses.

4. The method of claim 1, further comprising:
   passing the first communication mapped to the one of the reserved port addresses from a first device associated with the first and second interfaces to a second device, wherein the second device applies or causes to be applied the first type of security measures;
   passing the second communication addressed to a port not included in the first set of reserved port addresses to the second device, wherein the first device applies or causes to be applied the second type of security measures.

5. The method of claim 1, wherein the security measures of a first type do not require a user to provide any proof of identity in order to access a resource through the firewall computer, and wherein the security measures of a second type require a user to provide proof of their identity in order to access a resource through the first device.

6. The method of claim 1, wherein the security measures of a first type require that a user enter a password before accessing a resource, and wherein the security measures of a second type require that a user enter a password and provide proof of their identity in addition to a password.

7. A system for distinguishing and treating messages from different sources differently, comprising:
   a firewall computer, including:
      a plurality of source interfaces;
      a server interface;
      a list of reserved port addresses, wherein at least one of the source interfaces is a trusted source interface that is mapped to one of the list of reserved port addresses;
      program code configured to implement a set of rules associated with verification and authentication of messages received at the source interface;
   wherein a first message received at the at least one trusted source interface is addressed to one of the reserved port addresses and passed to the server interface, wherein, a first level of verification and authentication is applied to the first message based on the first message being addressed to one of the list of reserved port addresses; and
   wherein a second message received at one of the source interfaces is not addressed to one of the reserved port addresses, wherein, a second level of verification and authentication is applied to the second message based on the second message being addressed to a port address not included on one of the list of reserved port addresses;
   a server computer, including:
      an interconnection to the server interface of the firewall computer;
      program code configured to direct the first message addressed to one of the reserved port address to a first application and to direct the second message not addressed to one of the reserved port addresses to a second application;
   wherein the first application implements a first set of security requirements, wherein the second application implements a second set of security requirements, and wherein the first set of security requirements are a lower level than the second set of security requirements.

8. The system of claim 7, further comprising:
a first source interconnected to the at least one trusted source interface.

9. The system of claim 8, wherein the first source is interconnected to the at least one trusted source interface by a wireline connection.

10. The system of claim 8, further comprising:
a second source interconnected to a source interface that is not mapped to one of the reserved port addresses.

11. The system of claim 8, wherein the first and second applications are running on the server computer.

12. The system of claim 7, wherein the programming code configured to implement a set of rules blocks any message received at any source interface that is addressed to a port address included in the list of reserved port addresses.

13. A system for identifying a source of messages, comprising:
means for interfacing a firewall computer with two or more sources
means to receive two or more messages from the two or more sources;
means for identifying a set of reserved port addresses, wherein at least one of the sources is a trusted source interface mapped to one of the set of reserved port addresses on the firewall computer;
means for mapping a first message received from one of the two or more sources to one of said set of reserved port addresses, wherein a first level of authentication and verification is applied to the first message, based on the first message being addressed to one of the reserved port addresses;
means for mapping a second message received from one of the two or more sources to an address port that is not included in said set of reserved port addresses;
means for applying a second level of authentication and verification to the second message received from one of the two or more sources based on the mapping of the second message to the port address not included in said set of reserved port addresses;
means for directing the first message addressed to one of the reserved port address to a first application and means for directing the second message not included in said set of reserved port addresses to a second application;
wherein the first application implements a first set of security requirements, wherein the second application implements a second set of security requirements, and wherein the first set of security requirements are a lower level than the second set of security requirement.

* * * * *

UNITED STATES PATENT AND TRADEMARK OFFICE
CERTIFICATE OF CORRECTION

| | | |
|---|---|---|
| PATENT NO. | : 8,051,474 B1 | Page 1 of 1 |
| APPLICATION NO. | : 11/535425 | |
| DATED | : November 1, 2011 | |
| INVENTOR(S) | : Oeystein Bedin et al. | |

It is certified that error appears in the above-identified patent and that said Letters Patent is hereby corrected as shown below:

At Column 8, line 42, please delete "interface" and replace with --interfaces-- therein.

At Column 9, line 21, after the word "sources" please insert --;-- therein.

Signed and Sealed this
Twenty-sixth Day of June, 2012

David J. Kappos
*Director of the United States Patent and Trademark Office*